June 7, 1966     E. F. ZINK     3,254,781
SELF-LOADING VEHICLE Original Filed Aug. 30, 1961     6 Sheets-Sheet 1

INVENTOR.
EDWARD F. ZINK

BY Shanley & O'Neil

ATTORNEYS.

June 7, 1966  E. F. ZINK  3,254,781
SELF-LOADING VEHICLE
Original Filed Aug. 30, 1961  6 Sheets-Sheet 4

INVENTOR.
EDWARD F. ZINK
BY Shanley & O'Neil
ATTORNEYS.

June 7, 1966  E. F. ZINK  3,254,781
SELF-LOADING VEHICLE
Original Filed Aug. 30, 1961  6 Sheets-Sheet 5

INVENTOR.
EDWARD F. ZINK

BY Shanley & O'Neil
ATTORNEYS.

INVENTOR.
EDWARD F. ZINK
BY Shanley & O'Neil
ATTORNEYS.

United States Patent Office 3,254,781
Patented June 7, 1966

3,254,781
SELF-LOADING VEHICLE
Edward F. Zink, Knoxville, Tenn., assignor, by mesne assignments, to Joy Manufacturing Company, Pittsburgh, Pa., a corporation of Pennsylvania
Continuation of application Ser. No. 134,950, Aug. 30, 1961. This application Nov. 5, 1964, Ser. No. 410,824
15 Claims. (Cl. 214—501)

This application is a continuation of application Serial No. 134,950, filed August 30, 1961, now abandoned.

The present invention relates to self-loading vehicles, more particularly self-loading vehicles of the forward crowding loader type having a vertically swinging load support including a front loading shovel that discharges into a front dumping material-receiving body carried by the vehicle.

It is an object of the present invention to provide a self-loading vehicle that requires only low headroom.

Another object of the present invention is the provision of a self-loading vehicle having a low center of gravity.

Still another object of the present invention is the provision of a self-loading dump vehicle provided with a vertically swinging load support and so constructed and arranged that the dump body and the vertically swinging load support do not interfere with each other during dumping.

It is also an object of the present invention to provide a self-loading vehicle of the forward crowding loader type, in which the tractive effort needed for loading is greatly reduced.

Yet another object of the present invention is the provision of a self-loading dump vehicle of the forward dumping type, in which dumping is achieved both at a desirable height above the ground and at a desirable distance forward of the vehicle.

The invention also contemplates the provision of a wheeled self-loading vehicle in which the weight of the load tends to be distributed more uniformly between the sets of wheels.

It is also an object of the present invention to provide a wheeled self-loading vehicle well adapted to traverse uneven terrain.

Finally, it is an object of the present invention to provide a self-loading vehicle which will be relatively economical to manufacture, compact and strong in its construction, rapid and efficient in its operation, and rugged and durable in use.

Other objects and advantages will become apparent from a consideration of the following description, taken in connection with the accompanying drawings, in which.

Figure 1:
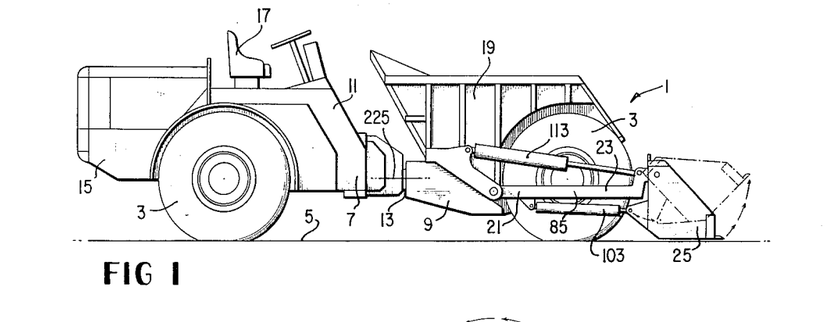
FIGURE 1 is a side elevational view of a self-loading vehicle according to the present invention, showing the vertically swinging load support in a lower position and the shovel in full line in the position it occupies before and during the first stage of loading the shovel and in phantom line in the position that it occupies after the shovel is loaded.
Figure 2:
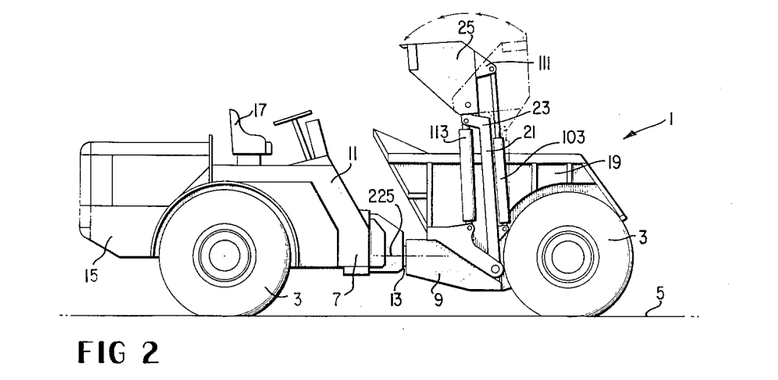
FIGURE 2 is a view similar to FIGURE 1 but showing the vertically swinging load support in an upper position with the shovel position before the shovel is unloaded shown in phantom line and the shovel position while the shovel is being unloaded and after the shovel has been unloaded shown in full line.
Figure 3:
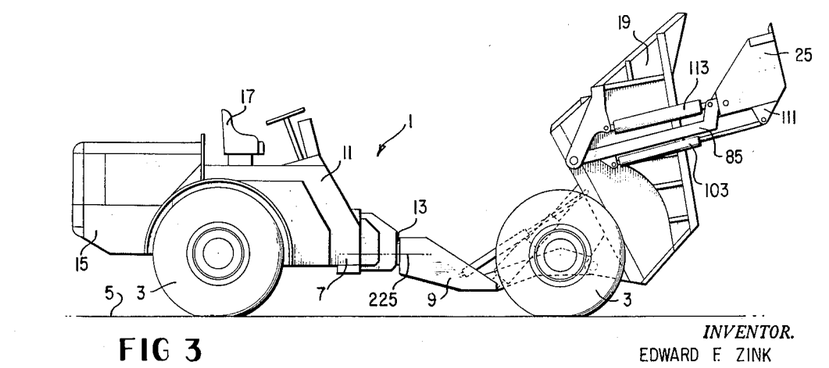
FIGURE 3 is a view similar to FIGURES 1 and 2 but showing the material-receiving body in dumping position.

Referring now to the drawings in greater detail, the broad outline of the invention can be seen on the first sheet of the drawings by comparison of FIGURES 1, 2 and 3. As will be apparent from a consideration of these figures, the present invention comprises a self-loading vehicle indicated generally at 1, supported by four wheels 3 on a level surface 5 such as the ground or the concrete flooring of a storage building or the floor of a mine or the like. Vehicle 1 has a chassis 7 comprised of a front chassis portion 9 and a rear chassis portion 11, the front wheels 3 being mounted on the front chassis portion and the rear wheels 3 being mounted on the rear chassis portion for rotation about horizontal parallel axes.

Chassis portions 9 and 11 are interconnected intermediate the length of the vehicle by means of a swivel joint 13 for rotation relative to each other about a horizontal axis extending in the direction of movement of the vehicle. Preferably, the axis of swivel joint 13 is coplanar with but perpendicular to the axes of wheels 3, and is disposed midway between the wheels of each pair of wheels 3.

Rear chassis portion 11 carries an engine 15 for rear wheel drive, and also carries an operator's station 17 that faces front, that is, in the direction of loading, during loading. Station 17 includes the usual seat and steering wheel, but the seat can swivel and dual controls are provided so the operator can turn and face the other way for better visibility during vehicle travel. Front chassis portion 9 carries a material-receiving and storing body comprising a dump body 19 and a vertically swinging load support 21. Load support 21 includes a pair of arms 23 mounted on dump body 19 for vertical swinging movement about a horizontal axis. Arms 23 carry a front loading shovel 23 at their outer ends. The vertically swinging load support is thus mounted on and moves with dump body 19 but also swings vertically relative to dump body 19.

The broad outline of the operation of the device is indicated sequentially in FIGURES 1, 2 and 3. As seen in FIGURE 1, the vehicle moves close to the material to be loaded with the shovel in the lowered full line position of FIGURE 1. The vehicle is then crowded forward to load the front portion of the shovel without undue crowding effort. Then, with the vehicle stationary, shovel 25 is swung forward and upward from the full line to the phantom line position of FIGURE 1 to complete the loading of the shovel. From the phantom line position of FIGURE 1, the shovel and vertically swinging load support are then swung upward to the phantom line position of the shovel shown in FIGURE 2. The shovel is then swung to the full line position shown in FIGURE 2, whereupon shovel 25 dumps into dump body 19. The vertically swinging load support is returned to lowered position and the loading operation is repeated as needed until the dump body contains the desired load, whereupon the vehicle can be driven from the loading station to the dumping station. When the material in the dump body has been carried to its destination, the dump body can be swung forwardly upward as seen in FIGURE 3 to unload the dump body. The vertically swinging load support is in raised position relative to the dump body and swings with the dump body during dumping movement of the dump body so as not to interfere with the discharge of material from the dump body.

Figure 4:
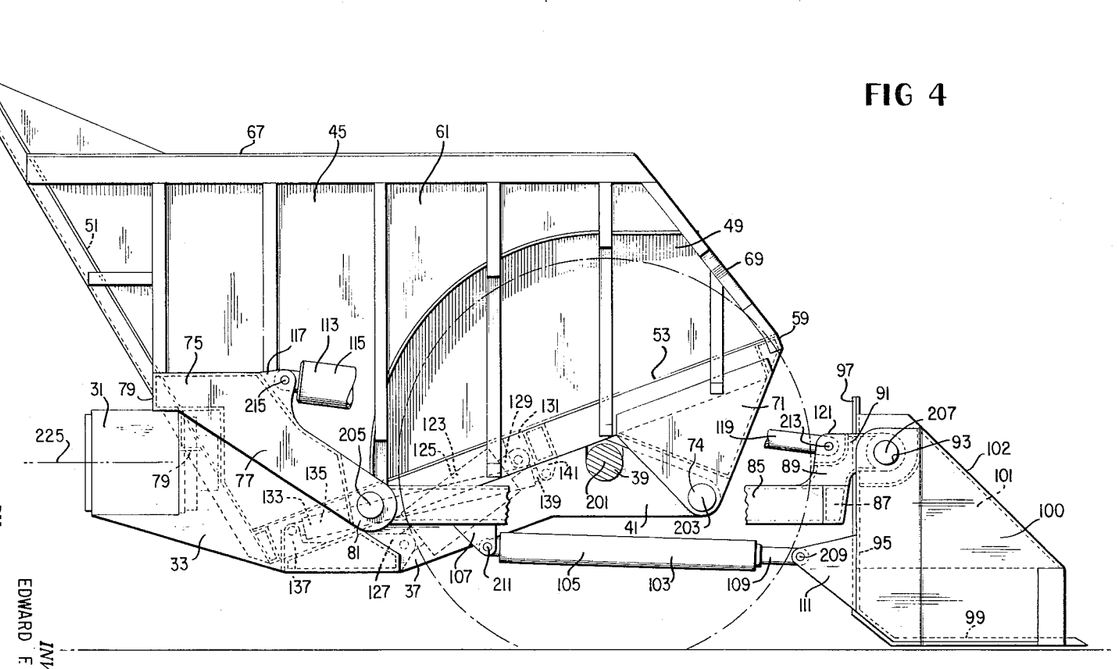
FIGURE 4 is a side view partly in section and with parts broken away, of the forward chassis portion of a self-loading vehicle according to the present invention, showing the dump body and the vertically swinging load support in lowered position.
Figure 7:
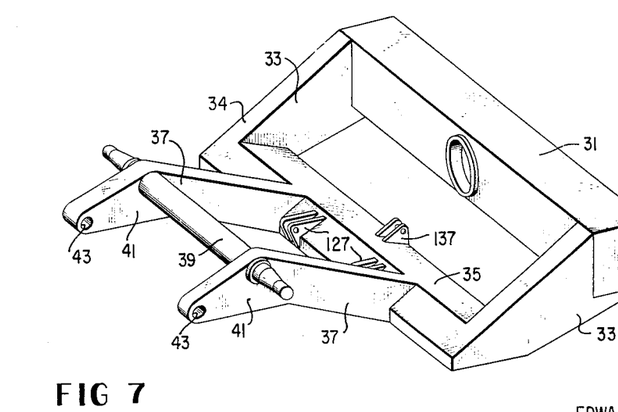
FIGURE 7 is a perspective view of the forward chassis portion of the present invention.

Referring now to the vehicle structure in greater detail, front chassis portion 9 is best seen in FIGURES 4 and 7 to include a rear horizontal transverse base member 31 that houses a portion of swivel joint 13 in its midportion and that terminates at its ends in forwardly and downwardly extending arms 33 having forwardly downwardly inclined upper surfaces 34. Arms 33 terminate at their lower ends in a cross piece 35 that rigidly interconnects them. A pair of arms 37, spaced apart a distance considerably less than arms 33, extends forwardly upward from the forward upper side of cross piece 35. Closer to their free ends than to their rear ends, arms 37 carrying a wheel axle 39 that extends between the uppermost portions of arms 37 and rigidly interconnect arms 37. Axle 39 is thus a brace that integrates arms 37 into a rigid box frame chassis portion. Axle 39 extends endwise outward beyond arms 37 on each side to provide mountings for the front wheels 3 one on each end of axle 39. Arms 37 continue on beyond axle 39 in downwardly forwardly extending ends 41 that terminate at a level somewhat below axle 39 in openings 43 for the reception of pivot pins by which the dump body is mounted for vertical swinging movement on and relative to arms 37.

Front chassis portion 9 is hollow, not only to reduce its weight without much loss of strength, but also to provide a housing for the hydraulic lines that actuate the mechanisms to be described below.

Figure 5:
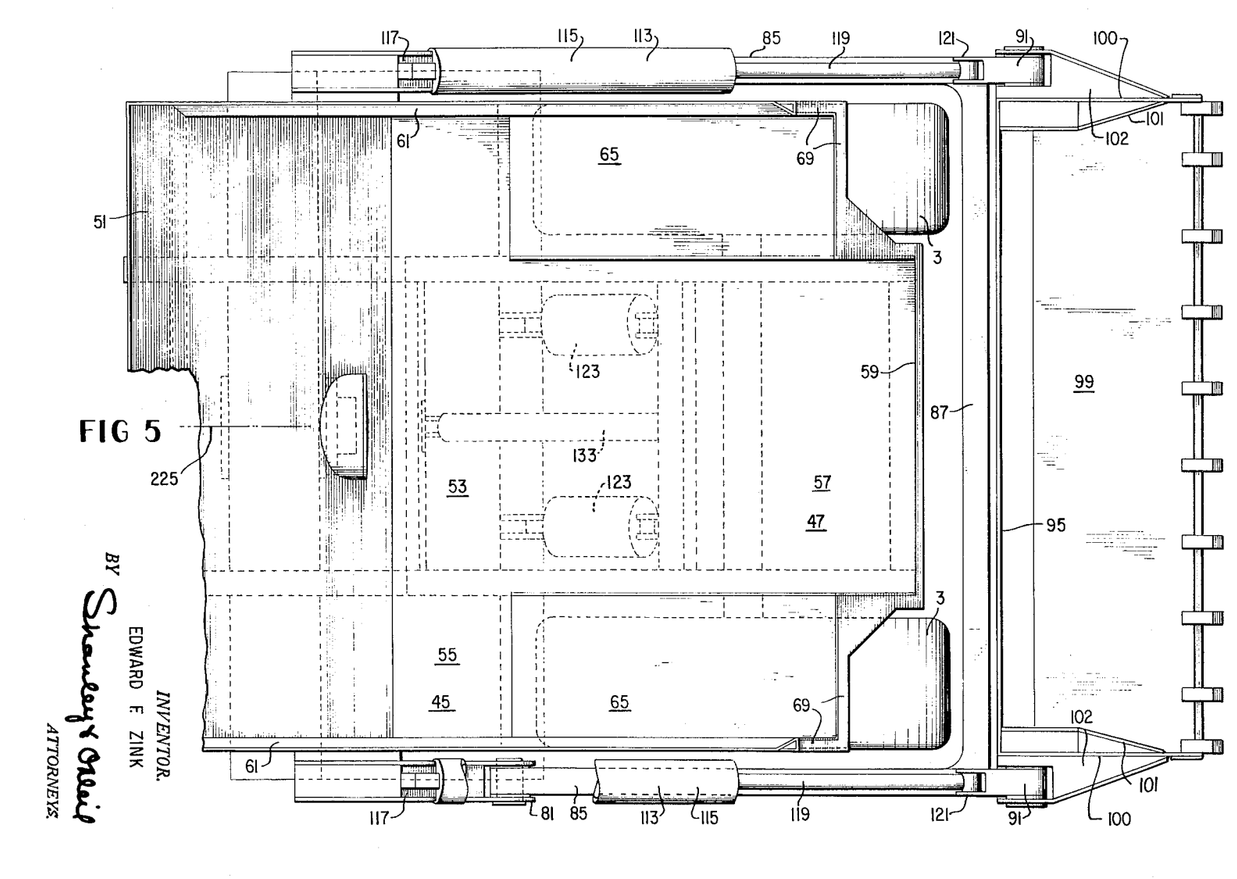
FIGURE 5 is a plan view of the structure shown in FIGURE 4.
Figure 6:
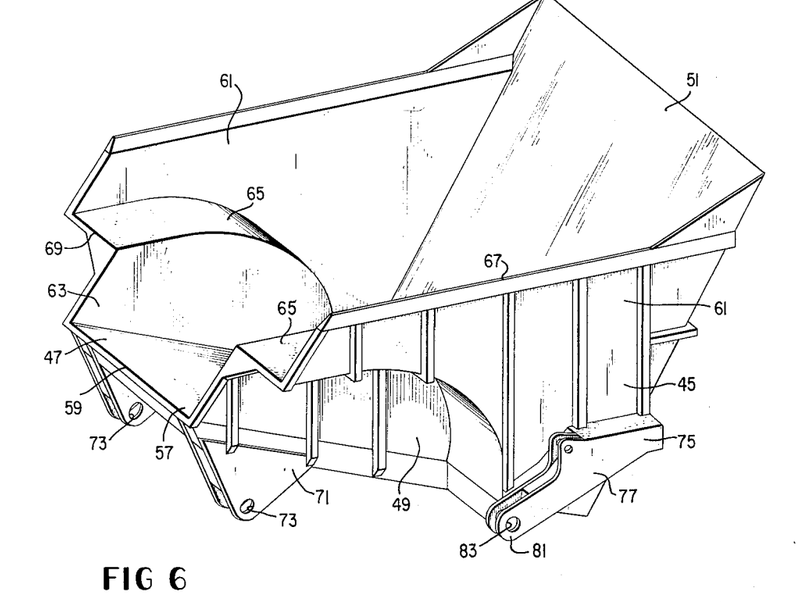
FIGURE 6 is a perspective view of the dump body of the present invention.

Dump body 19 is best seen in FIGURES 4, 5 and 6 to include a relatively wide body portion 45 at the rear of the dump body and a relatively narrow body portion 47 at the front of the dump body, the front of the dump body being on the right side of FIGURES 4 and 5 and on the left side of FIGURE 6. Dump body 19 is characterized by a pair of wheel recesses 49 one on either side of narrow body portion 47 at the front of the dump body, and a front wheel 3 is disposed in each wheel recess 49 as perhaps best seen in FIGURE 5. The provision of wheel recesses 49 in combination with wide body portions 55 to the rear thereof contributes greatly to lowering the center of gravity of the loaded vehicle.

Dump body 19 is closed at its rear by a rear wall 51 that extends from its upper edge at the highest portion of the dump body forwardly downward to its lower edge at the lowermost portion of the dump body as best seen in FIGURE 4. A bottom wall 53 extends forward from the bottom of rear wall 51 and has a relatively wide rear portion 55 that forms part of the bottom of wide body portion 45, and a relatively narrow front portion 57 between recesses 49 that forms the bottom of relatively narrow body portion 47. Front portion 57 terminates at its front in a forward lip 59. Bottom wall 53 is forwardly upwardly inclined from rear wall 51 to lip 59.

Dump body 19 also has side walls having relatively widely spaced apart side wall portions 61 bounding wide body portion 45 and relatively closely spaced side wall portions 63 between recesses 49. Arcuate hoods 65 overlie wheel recesses 49 and interconnect side wall portions 61 and 63 on each side of dump body 19. The relatively widely spaced side wall portions 61 terminate upward in upper edges 67 that are horizontal when the dump body is in its lowermost position as seen in FIGURE 4. Widely spaced side walls 61, closely spaced side walls 63 and arcuate hoods 65 terminate to the front in forward edges 69 which are downwardly forwardly inclined as seen in FIGURE 4.

Brackets 71 are secured to the front portions of the lower side edges of relatively narrow front portion 57, roughly in the vertical planes of relatively closely spaced side wall portions 63. Brackets 71 at their lower forward portions are provided with aligned openings 73 for the reception of pivot pins that pass through openings 73 on the dump body and 43 on the chassis swingably to interconnect dump body 19 and front chassis portion 9. Wheel axle 39 is disposed as high as possible in the crotch between bottom wall 53 and brackets 71, and bottom wall 53 and brackets 71 extend substantial distances diagonally downward on either side of wheel axle 39.

Secured to the sides and rear of dump body 19 is a U-shaped yoke 75 having forwardly downwardly extending arms or thrust pads 77 which are interconnected at their rear ends by horizontal and vertical thrust bearing members 79 that extend across and are secured to rear wall 51 of dump body 19. Arms 77 on their undersides have downwardly forwardly inclined surfaces that have wide surface contact with upper surfaces 34 of arms 33 of front chassis portion 9, so that in effect at least the rear portion of dump body 19 rests on front chassis portion 9 through these interengaged diagonally disposed surfaces of arms 33 and 77. Rear thrust bearing members 79 also have horizontal and vertical surfaces in contact with horizontal and vertical surfaces, respectively, of base member 31 of front chassis portion 9 when the dump body is in its lowered position as seen in FIGURE 4.

Arms 77 terminate downward in lugs 81 having openings 83 therethrough disposed below the plant of bottom wall 53 for the reception of pivot pins by which the arms 23 of vertically swinging load support 21 are mounted on dump body 19 for vertical swinging movement about a horizontal axis parallel to the axis of vertical swinging movement of dump body 19. It is to be noted that yoke 75 thus has extensive areas of contact with front chassis portion 9.

Arms 23 of vertically swinging load support 21 have major rear portions 85 that are straight and roughly horizontal in their lower positions as seen in FIGURE 1. At the outer ends of major portions 85, a crosstie 87 extends between and rigidly interconnects the arms 23 on either side of dump body 19. Crosstie 87 is thus a brace that integrates arms 23 into a rigid vertically swinging load support. Arms 23 have upwardly extending portions 89 above crosstie 87 and these upwardly extending portions 89 in turn terminate outward in horizontal forwardly extending portions 91 which are provided at their forward ends with aligned openings 93 for the reception of pivot pins by which shovel 25 is mounted on the outer ends of arms 23 for vertical swinging movement about a horizontal axis relative to arms 23.

Shovel 25 has a rear wall 95 that is vertically disposed when the vertically swinging load support is in its lower position shown in FIGURE 4. Rear wall 95 terminates upward in a lip 97 which extends above and is disposed behind the pivot of the shovel on the arms. Nevertheless, the shovel pivot is also in an upper rear portion of the shovel. The shovel also has a bottom wall 99 that is horizontal in the position of FIGURE 4 and which terminates at the front in a toothed digging edge. Rear wall 95 and bottom wall 99 are interconnected by side walls 100.

In order to accommodate the pivotal mounting of bucket 25 on arms 23, a generally triangular plate 101 is secured to the inner side of each side wall 100 with a lower horizontal edge of plate 101 connected to side wall 100 and the remainder of plate 101 diverging upward from side wall 100 so that plates 101 converge upward in the lower shovel position shown in FIGURES 4 and 5. Thus, the width of the bottom of rear wall 95 is greater than the width of the top of rear wall 95. Another plate 102 diverges rearwardly outward from plate 100. Forward portion 91 of arm 23 is disposed between side wall 100 and plate 102 and the pivot pin is carried by both of those members. Arms 23, and indeed all the mechanisms on the outer sides of front wheels 3, are thus protected from damage by the relatively wider portions of the shovel, for the operating mechanism of the vertically swinging load support is in effect masked by the shovel from the front. Also, the assembly of members 100, 101 and 102 provides a strong support for the pivot pins on which the shovel is largely supported.

It is thus significant to note that the pivotal mountings of shovel 25 on arms 23 are in front of rear wall 95, below upper lip 97, above bottom wall 99 and between plates 102.

In addition to masking the operating mechanism, the assembly of side wall 100 and plates 101 and 102 performs a function at least equally important, when the shovel is in an upper position such as the full line position of FIGURE 2, for in that raised position the plates 101 converge downward to direct material falling from the shovel toward the center of material receiving body 19. The vertical swinging movement of arms 23 turns shovel 25 through 90° between the full line position of FIGURE 1 and the phantom line position of FIGURE 2. Moreover, shovel 25 can be turned another 90° relative to arms 23. As a result, shovel 25 turns 180° relative to the vehicle during its loading movement, so that plates 101 are inverted and their convergence reversed.

Hence, plates 101 and 102 perform a dual function: in the full line position of FIGURE 1 they help mask the operating mechanism, but in the full line position of FIGURE 2 they funnel the material toward the center of body 19. Not only does this funnelling action of the shovel prevent spillage from the sides of body 19, but also it permits the use of a shovel wider than body 19 for increased shovel capacity, as is apparent from FIGURE 5.

Means are provided for swinging shovel 25 vertically about its pivot relative to arms 23, comprising a fluid motor 103 mounted below each arm 23 and acting between a point on the arm below the arm, and a point on the shovel a substantial distance below the pivot of the shovel on arms 23. Specifically, each motor 103 includes a cylinder 105 mounted for vertical swinging movement about a horizontal axis at its rear end on ears 107 that depend from arms 23 adjacent the rear of those arms. A piston and piston rod assembly 109 rides in cylinder 105 and is connected at its forward end to ears 111 which are secured to rear wall 95 of shovel 25 at the lower outer ends thereof. The pivots of motors 103 on the shovel, like the pivots of arms 23, are masked from the front by the shovel.

Flexible fluid conduits (not shown) interconnect both ends of cylinder 105 with a conventional fluid motive system (not shown) including a pump driven by engine 15, a fluid supply chamber and a suitable valve bank operable from the operator's station selectively to direct fluid under pressure to, or to exhaust fluid from, either end of cylinder 105. The handling of the fluid of the fluid system of the present invention is conventional and need not be described in detail. Suffice it to say that to move the shovel from the full line to the phantom line position in FIGURE 1, or from the phantom line to the full line position of FIGURE 2, pressure fluid is admitted to the side of the piston opposite the shovel and fluid is exhausted from the cylinder on the same side of the piston as the shovel. If desired, pressure fluid can also be diverted to the other end of the cylinder to move the shovel from the full line to the phantom line position of FIGURE 2 at the end of the loading movement of the vertically swinging load support.

When the shovel has been loaded by the operation of fluid motor 103, the vertically swinging load support is then swung up to the full line position shown in FIGURE 2, the shovel being first brought to the phantom line position of FIGURE 2 and then to the full line position of FIGURE 2, in order to place the material farther to the rear of the dump body. This vertical swinging movement of arms 23 is effected by operation of fluid motors 113 driven by the fluid system described above and disposed one above each arm 23, and each comprising a cylinder 115 pivoted about a horizontal axis on ears 117 on arms 77 of yoke 75 on dump body 19. A piston and piston rod assembly 119 rides in cylinder 115 and is secured to and acts on arm 23 at the juncture of upwardly extending portion 89 and horizontal portion 91 of arm 23 through ears 121 at that point, to which piston and piston rod assembly 119 is pivotally connected for relative vertical swinging movement.

After dump body 19 has been filled by repeated swings of vertically swinging load support 21, the vehicle is driven from the loading station to the dumping station. Dumping is effected by swinging dump body 19 up and forward about its pivotal mounting on the forward down-turned ends 21 of front chassis portion 9. To this end, a pair of fluid motors 123 are provided which may if desired be of the multiple cylinder type in order to be sufficiently extensible and may thus include concentric telescoping cylinders 125 mounted at their rear ends for vertical swinging movement about horizontal axes provided by ears 127 carried by a forward portion of cross piece 35 of front chassis portion 9 between arms 33 thereof, as seen in FIGURES 4 and 7. A piston and piston rod assembly 129 moved by fluid motor 123 connects at its forward end for vertical swinging movement with and relative to ears 131 secured to the underside of dump body 19. Pressure fluid from the fluid system described above is supplied to at least the side of the piston of fluid motor 123 away from the dump body thereby to raise the dump body up to the full dump position shown in FIGURE 3, in which the center of gravity of the empty dump body is disposed forward of the axis of swinging movement of the dump body.

In order to snub the forward movement of dump body 119 over center, and to initiate the return of the dump body to its lowered position, a further fluid motor 133 is provided between the front chassis portion and the dump body, comprising a cylinder 135 pivotally mounted for vertical swinging movement about a horizontal axis adjacent its rear end on ears 137 on a rear portion of cross piece 35 midway between arms 33 on front chassis portion 9, as seen in FIGURES 4 and 7. A piston and piston rod assembly 139 rides in cylinder 135 and acts on the underside of dump body 19 through ears 141 by which the piston rod is connected to the dump body for relative vertical swinging movement about a horizontal axis. Pressure fluid from the fluid system described above is supplied to at least the same side of the piston of motor 133 as dump body 19, thereby to provide a cushion for at least the last portion of the forward swinging movement of dump body 19 over center, and to initiate return from the fully swung position of FIGURE 3 over center to the point that cylinders 125 can take over to return dump body 19 to its lowermost position as in FIGURE 1, whereupon the loading operation may be repeated.

It will now be apparent that there are 13 horizontal axes of vertical swinging movement of different portions of the structure of the present invention relative to each other, and that the essential operative relationships of the present invention can be expressed in terms of the position and the movement of these axes relative to each other and relative to the structure of the present invention. These 13 axes are as follows:

Axis 201, the axis about which the front wheels 3 rotate on axle 39.

Axis 203, the axis of vertical swinging movement of dump body 19 and also the axis of openings 43 and 73.

Axis 205, the axis of vertical swinging movement of vertically swinging load support 21 and also the axis of openings 83.

Axis 207, the axis of vertical swinging movement of shovel 25 relative to arms 23 and also the axis of openings 93.

Axis 209, on which lie the points of articulation between fluid motors 103 and shovel 25 on ears 111.

Axis 211, on which lie the points of articulation between fluid motors 103 and arms 23 on ears 107.

Axis 213, on which lie the points of articulation between fluid motors 113 and arms 23 on ears 121.

Axis 215, on which lie the points of articulation between yoke 75 and fluid motors 113 on ears 117.

Figure 10:
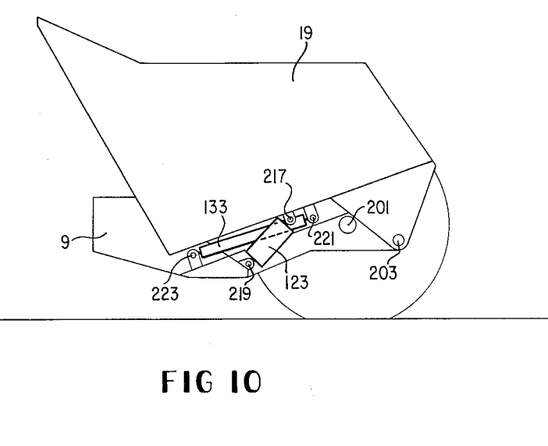
FIGURE 10 is a diagrammatic view illustrating the dumping mechanism in a lower position of the dump body.
Figure 11:
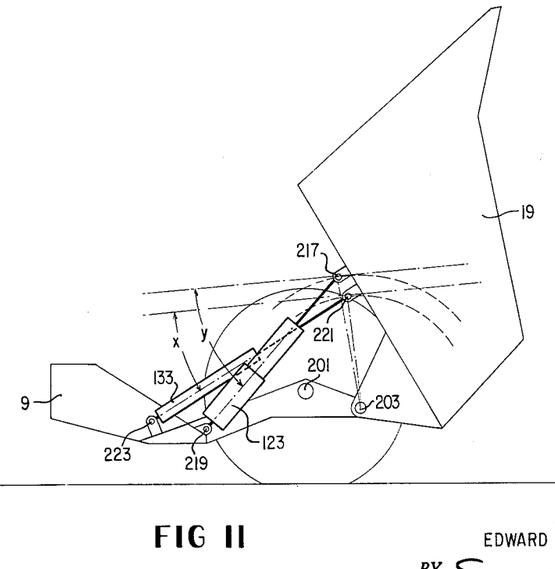
FIGURE 11 is a view similar to FIGURE 10 but showing the parts in full dumping position and illustrating certain relationships between the principal parts of the dumping mechanism.

Axis 217, on which lie the points of articulation between fluid motors 123 and dump body 19 on ears 131, as best seen in FIGURES 4, 10 and 11.

Axis 219, on which lie the points of articulation between front chassis portion 9 and motors 123 on ears 127.

Axis 221, on which lies the point of articulation between fluid motor 133 and dump body 19 on ears 141.

Axis 223, on which lies the point of articulation between fluid motor 133 and front chassis portion 9 on ears 137.

Axis 225, the axis about which front and rear chassis portions 9 and 11 swivel relative to each other and which runs lengthwise of the vehicle in the direction of vehicle movement.

All of these axes are normally horizontal. Axis 201–223 are all parallel to each other. Axes 203–225 are all axes of vertical swinging movement of portions of the vehicle relative to other portions.

Dealing now with the signifiicance of these axes, and first with regard to axis 201, the wheel axis, it should be noted that most of dump body 19 is to the rear of the vertical plane that includes this axis, particularly the wide body portion of the dump body. This assures that a great deal of the weight of the loaded dump body will be borne by the rear wheels as wells as by the front wheels. Even distribution of the load among the wheels makes possible the use of tires of minimum size.

It should also be noted that a portion of dump body 19 is at a lower level than the horizontal plane that includes axis 201, whereby the center of gravity of the loaded dump body is as low as possible. The floor of dump body 19 thus extends from a lowermost rear portion substantially below axis 201 to an uppermost front portion above axis 201, axis 201 being disposed as close to the floor as is possible consistent with the vehicle structure.

It should be particularly noted that axis 203, the dump body axis, is below and forward of axis 201. Positioning axis 203 below and forward of axis 201 assures that upon dumping movement, the front lip of the dump body will move forward as well as downward, for a distance such that the dumped material will clear the wheels and at the same time the material will be dumped from a height sufficient to clear low retaining walls and the like. Dumping sufficiently far forward and at a sufficient elevation could also be achieved by moving axis 203 forward, or forward and upward, but moving axis 203 forward would require lengthening the shovel arms, and this in turn would make the shovel swing higher to load the dump body, which in turn would increase the head room required for the operation of the vehicle. Moving axis 203 forward would also increase the height to which dump body 19 rises upon dumping, which would again increase the needed head room. Moving axis 203 forward and upward would still further increase the height to which dump body 19 swings during dumping.

Axis 205, about which arms 23 swing, is disposed as low as possible, below axis 201 and preferably also below axis 203 as seen in FIGURE 4. Axis 203 should not be too low, lest the forward lip of the dump body be disposed too low in the full dump position, but otherwise the lower axis 205 is, the better, for the lower axis 205 is the lower shovel 25 need rise above dump body 19 and the less head room the vehicle requires during loading. At the same time, axis 205 should be as close as possible to wheels 3. It is preferred that axis 205 not pass through wheels 3, but rather pass immediately behind them, so that the ears 81 that surround axis 205 will not interfere with changing the tires. On the other hand, axis 205 should be as close as possible to crosstie 87 so as to keep the length of arms 23 as short as possible thereby to lower the elevation of shovel 25 in its raised position and reduce the needed headroom. This means that axis 205 and crosstie 87 should be spaced apart a distance only very little greater than the diameter of front tires 3. Axis 205 and shovel 25 thus lie on opposite sides of axis 201 in a lowered position of the vertically swinging load support 21. By contrast, however, axis 203 should pass through the wheels, and for this purpose, the means which mounts dump body 19 on forward chassis portion 9 for vertical swinging movement about axis 203 is disposed between the wheels.

It will also be observed that axes 203 and 205 are on opposite sides of the vertical plane that includes axis 201, and that all of axes 201, 203 and 205 are disposed beneath bottom wall 53 of dump body 19.

Turning now to the action of the vertically swinging load support and its coaction with the rest of the vehicle, particularly in its lowered positions but also in its raised positions, it will be noted that axis 207 is quite close to the top of shovel 25 but that axis 209 is a substantial distance below 207. This feature makes it possible to achieve the desirable loading action shown between the full and phantom line positions of FIGURE 1, in which axis 207 can be held stationary and the shovel can be at least partly loaded by swinging it forward and up counterclockwise as seen in FIGURE 1. This loading action is quite important, for it enables a great reduction of the tractive efforts needed to load the shovel. Instead of relying entirely on loading by crowding, the vehicle can at least to some extent be held stationary and fluid motor 103 operated to achieve the loading effect of FIGURE 1. Thus the first part of the shovel loading operation can be achieved by crowding, and when the crowding effort becomes undesirably great the vehicle can be stopped and the last part of the shovel loading operation can be effected by manipulation of the shovel itself about axis 207.

The manner of loading described above also coacts with the shovel width described still earlier in connection with converging plates 101, for the wide shovel masks the mechanism that makes possible this manner of loading, while at the same time the width of the shovel so increases the loading effort that the above manner of loading first by crowding and then by swinging the shovel relative to the stationary arms becomes particularly desirable.

It will also be apparent from FIGURE 4 that when the vertically swinging load support is in a lower position, axes 207 and 209 are disposed on opposite sides of a vertical plane parallel to those two axes and passing through crosstie 87. It will also be noted that axes 207 and 209 are on opposite sides of a plane that includes axis 205 and that passes through crosstie 87. Rear wall 95 of the shovel is disposed between axis 207 and crosstie 87, and upper lip 97 of the rear of the shovel is above axis 207. The other axis of fluid motor 103, axis 211, like axis 209 is below a plane including axis 205 and passing through crosstie 87.

This relationship of axes 207, 209 and 211 relative to each other and to the other portions of the structure and particularly to crosstie 87 gives rise to a number of novel and useful results. In addition to the shovel loading action of FIGURE 1, described above, the location of axis 209 and also the location of axis 211 makes it possible for fluid motor 103 to assume the full line position of FIGURE 2 without interference between motor 103 and crosstie 87. The location of axis 209 a substantial distance to the rear of axis 207 and even to the rear of crosstie 87 assures that the lever arm about axis 207, that is, the distance from axis 207 to the axis of motor 103, will be as great as possible for as long as possible before axis 209 rises substantially relative to axis 207 in its counterclockwise movement about axis 207 as seen in FIGURE 4. The location of axis 207 in front of crosstie 87 avoids interference between the shovel and the crosstie, and the location of axis 207 above and in front of crosstie 87 assures that lip 97 of the shovel will contact crosstie 87 thereby to serve as a stop to prevent further vertical swinging movement of the shovel relative to arms 23 when the shovel reaches the full line position of FIGURE 2. The relationship of axis 207, lip 97 and crosstie 87 also assures that lip 97 will overlie crosstie 87 in the dumping position of the shovel as in FIGURE 2 so that crosstie 87 will not get in the way of material that is being unloaded from the shovel into the dump body. The position of axes 209 and 211 also permits mounting fluid motors 103 directly below arms 23, so that the vehicle is made as narrow as possible and motor 103 can advance behind shovel 25 without the need for making shovel 25 excessively wide.

The location of axes 213 and 215, the axes of articulation of fluid motor 113, is also significant. Axis 215 is located a substantial distance from the plane common to axes 205 and 213, not only to give fluid motor 113 mechanical advantage in raising the vertically swinging load support but also to prevent vertical swinging movement of the load support about axis 205 during the loading movement of FIGURE 1, at which time motor 113 serves as a rigid strut in compression, as will be discussed in greater detail below.

The location of axes 205 and 215 passing through portions of yoke 75 is also quite significant, for this assures that the stresses during loading and raising of the vertically swinging load support are applied not to the dump body proper but rather to yoke 75, and from yoke 75 directly to front chassis portion 9. As a result of this construction, the vertically swinging load support can be mounted on the dump body without the need for significantly strengthening the dump body to receive it, by providing on the dump body a support for the dump body in the lowered position such that the vertically swinging load support is mounted not on the dump body proper but rather on that support. At the same time, the support is carried by the dump body upon vertical swinging movement of the dump body, so that the vertically swinging load support swings with the dump body to get out of the way of the material being dumped, but does not impose substantial strain on the dump body.

In connection with this latter feature, it is important to observe that the upper and lower limits of contact between yoke 75 and front chassis portion 9 are on opposite sides of the horizontal plane that includes axis 205. It is also important to note that thrust bearing members 79 of yoke 75 are closely adjacent, and in the illustrated embodiment lie across the plane common to axes 205 and 211, as seen in FIGURE 4. The significance of this last relationship is that the loading stresses applied to arms 23 by expanding fluid motors 103 are applied at axis 211 and thence are transmitted to the dump body at axis 205, so that the effective plane of application of those forces is the plane common to axes 205 and 211. Although the forces imposed by the dump body on the front chassis portion are applied all along the areas of mutual contact, from below axis 205 to the top of base member 31, the thrust bearing members 79 best serve to transmit generally horizontally applied forces because they have vertical surfaces in contact with front vertical surfaces of base member 31 of front chassis portion 9. Accordingly, the location of thrust bearing members 79 of yoke 75 closely adjacent and preferably on the plane common to axes 205 and 211 best serves to transmit those forces directly to the front chassis portion.

Figure 8:
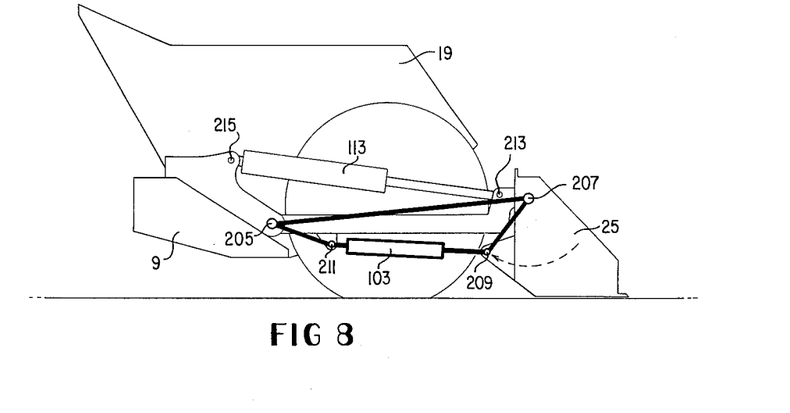
FIGURE 8 is a diagrammatic view illustrating certain mechanical relationships between the principal parts of the vertically swinging load support.
Figure 9:
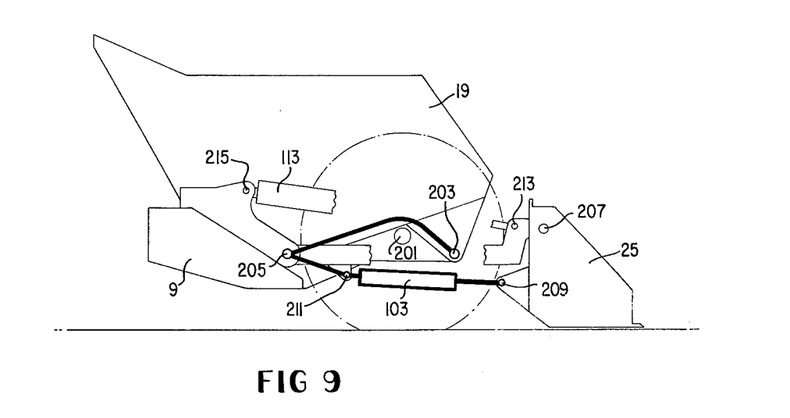
FIGURE 9 is a view similar to FIGURE 8 but showing certain relationships between the vertically swinging load support and the vertically swinging dump body.

Still other relationships between the various axes will be appreciated, and the relationships already described will be better understood, by reference to FIGURES 8 and 9 of the drawings. In FIGURES 8 and 9, fluid motor 103 is indicated as an expansible linkage and the other portions of the structure interconnecting the various pertinent axes are indicated by heavy lines as rigid linkages.

In FIGURE 8, the reaction of the load to the action of the shovel is largely applied at axis 209 in a direction indicated by the dotted arrow concentric with axis 207. This force is transmitted in both directions from axis 209, that is, toward axis 211 and toward axis 207. The portion directed toward axis 207 tends to swing axis 207 counterclockwise about axis 205 as seen in FIGURE 8. However, axis 213 is rigid with axis 207, for they both pass through arm 23; and in the position of the parts shown in FIGURE 8, axes 213 and 215 are rigid with each other, for fluid motor 113 acts as an incompressible linkage in this position. Moreover, axes 205 and 215 are rigid with each other. It therefore follows that axis 207 cannot move counterclockwise relative to axis 205 under force applied to axis 209 in the direction of the dotted arrow.

Accordingly, the diagram of FIGURE 8 is modified to become the diagram of FIGURE 9, and the linkages connected with axis 207 are omitted because axis 207 is fixed during the loading of the shovel. Instead, another linkage from axis 205 is shown extending up and over wheel axis 201 and down again to axis 203 of the dump body. This linkage represents the rigid interconnection between axes 203 and 205. As seen in FIGURE 9, axis 203 is now the fixed point, about which the linkage can turn, axis 209 is the point of force application, and axes 205 and 211 are intermediate points of articulation. As will now be apparent, upon application of force at axis 209 as during the shovel loading movement of FIGURE 1, axis 205 tends to move clockwise about axis 203. It does not actually so move, of course, for the dump body is sufficiently heavy to prevent it. Instead, force is applied in a direction from axis 211 to axis 205, and that force has a substantial upward component and a substantial component tangential to the locus of axis 205 about axis 203 as a center, and this upward component of force tends to counterbalance a portion of the weight of the dump body. As a result, that portion of the loading stress which is not passed directly back to front chassis portion 9 tends to be borne by the dump body in the way the dump body is best able to bear it, namely, as a force opposite to the forces imposed on the lower portions of the dump body by the weight of the upper portions and contents of the dump body. The importance of disposing axis 203 above the plane of the axes of motors 103, that is, above the plane defined by axes 209 and 211, will now be apparent, for thus is the above-mentioned lifting force applied to the dump body.

The positions of axes 217, 219, 221 and 223 are particularly important relative to each other and relative to the position of axis 203, and their positions are also important relative to the position of axis 201. The relationships of these axes to each other and to the structure of the invention are best illustrated in FIGURES 10 and 11. Axes 217 and 221, which mark the points at which motors 123 and 133, respectively, act on dump body 19, are as high and as far front as possible without interfering with axle 39 that marks axis 201, and axis 217 is farther from axis 203 than is axis 221. In this way, the axes of motors 123 in the lowered position of the dump body shown in FIGURE 10 are at the greatest possible angle to the plane which includes axes 203 and 217. For this same purpose, axis 219 is substantially closer to axis 203 than is axis 223, these latter two axes including the points at which motors 123 and 133, respectively, act on the vehicle.

In raised position, however, and more particularly in the full dump position shown in FIGURE 11, the relationship of the positions of fluid motors 123 and 133 relative to the dump body is reversed, and in this latter instance the axis of motor 133 is nearly perpendicular to the plane which includes axes 203 and 221, while the axes of motors 123 form a much smaller angle with their corresponding reference plane including axes 203 and 217.

The ideal arrangement of the fluid motors would be that the axes of motors 123 are perpendicular to the plane including axes 203 and 217 in the position of FIGURE 10 while the axis of motor 133 is perpendicular to the plane including axes 203 and 221 in the position of FIGURE 11. However, this relationship is not practically obtainable in the limited space available. Hence, the motors are positioned as favorably as possible in the limited space available.

The axes 217 and 221, which move during dumping in arcs concentric with axis 203, have loci which are indicated in FIGURE 11 by dotted arcs. Ideally, the axis of motor 133 should coincide with the tangent to the locus of axis 221 at the position of axis 221 when dump body 19 is in the full dump position of FIGURE 11. Short of this, however, the axis of motor 133 should form as small an angle $x$ as possible with that tangent, as seen in FIGURE 11. Considering the axes of motors 123 to form an angle $y$ with their corresponding tangents in that full dump position, the desired relationship between the axes of the fluid motors and the loci of their respective points of action against the dump body is that the secant of angle $x$ should be substantially less than the secant of angle $y$. In the illustrated embodiment, in which dump body 19 tilts through about 70° of arc to dump, sec $x$ is equal to about 1.1 and sec $y$ is equal to about 1.3. If $x$ were equal to 0, sec $x$ would of course be 1.0. By the same token, in the lowered position of the dump body shown in FIGURE 10, the relationship of the secants of angles $x$ and $y$ is reversed, and the secant of angle $y$ is substantially less than the secant of angle $x$.

Finally, the provision and orientation of axis 225, about which the front and rear chassis portions turn relative to each other, is significant, for this last axis provides a means for the axes of the front and rear wheels to move out of parallelism with each other, whereby each wheel may find its subjacent support on uneven terrain. This feature is particularly useful in connection with a self-loading vehicle having a vertically swinging load support of the front loading shovel type, for it assures that the shovel will always be substantially parallel to the surface on which the front wheels rest and will thus be able to load down as close as possible to that surface. This feature is also important in that it permits effective use of four-wheel drive or four-wheel braking, so that greater tractive effort or braking force may be applied to the wheels during the loading operation. If the vehicle is used for loading solely by crowding, then this greater tractive ability is advantageous; while if the vehicle is used for loading in a stationary position with the loading effort applied by fluid motors 103, then the greater braking force made possible by this feature is of benefit.

It should also be noted that axis 225 is disposed as close as is convenient to the plane of the points of contact of the ties with the ground and in any event no higher than about the plane of the front and rear wheel axes. This feature is significant to reduce to a minimum the lateral forces applied to any of the three supported wheels when the fourth wheel drops, that is, when the wheel axles cant relative to each other about axis 225.

From a consideration of the foregoing disclosure, it will be obvious that all the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. A self-loading vehicle having a material receiving body and a vertically swinging load support, the load support comprising a pair of arms mounted adjacent one end on the vehicle and extending one on either side of the material receiving body for vertical swinging movement about a first horizontal axis, a shovel supported by the arms adjacent their other ends for vertical swinging movement relative to the arms about a second horizontal axis parallel to the first axis, means acting between the vehicle and at least one of the arms to swing the vertically swinging load support about the first axis, means acting between at least one of the arms and a point on the shovel which is substantially below the second axis in a lower position of the shovel to swing the shovel about the second axis, a crosstie rigidly interconnecting the arms a short distance from the second axis, the crosstie being closer to the first axis than is the second axis, said point on said shovel and the second axis lying on opposite sides of a vertical plane parallel to the first axis and passing through the crosstie in a lower position of the shovel.

2. A self-loading vehicle having a material receiving body and a vertically swinging load support, the load support comprising a pair of arms mounted adjacent one end on the vehicle and extending one on either side of the material receiving body for vertical swinging movement about a first horizontal axis, a shovel supported by the arms adjacent their other ends for vertical swinging movement relative to the arms about a second horizontal axis parallel to the first axis, means acting between the vehicle and at least one of the arms to swing the vertically swinging load support about the first axis, means acting between at least one of the arms and a point on the shovel which is substantially below the second axis in a lower position of the shovel to swing the shovel about the second axis, a horizontal crosstie rigidly interconecting the arms a short distance from the second axis, the crosstie being closer to the first axis than is the second axis, and the second axis being disposed above a plane including the first axis and passing through the crosstie in a lower position of the shovel.

3. A self-loading vehicle having a material receiving body and a vertically swinging load support, the load support comprising a pair of arms mounted adjacent one end on the vehicle and extending one on either side of the material receiving body for vertical swinging movement about a first horizontal axis, a shovel supported by the arms adjacent their other ends for vertical swinging movement relative to the arms about a second horizontal axis parallel to the first axis, means acting between the vehicle and at least one of the arms to swing the vertically swinging load support about the first axis, means acting between at least one of the arms and a point on the shovel which is substantially below the second axis in a lower position of the shovel to swing the shovel about the second axis, a horizontal crosstie rigidly interconnecting the arms a short distance from the second axis, the crosstie being closer to the first axis than is the second axis, the second axis being disposed above a plane including the first axis and passing through the crosstie in a lower position of the shovel, said point on said shovel being disposed below said plane, and said means acting between at least one of the arms and a point on the shovel acting on said at least one arm at a point below said plane.

4. A self-loading vehicle having a material receiving body and a vertically swinging load support, the load support comprising a pair of arms mounted adjacent one end on the vehicle and extending one on either side of the material receiving body for vertical swinging movement about a first horizontal axis, a shovel supported by the arms adjacent their other ends for vertical swinging movement relative to the arms about a second horizontal axis parallel to the first axis, means acting between the vehicle and at least one of the arms to swing the vertically swinging load support about the first axis, means acting between at least one of the arms and a point on the shovel which is substantially below the second axis in a lower position of the shovel to swing the shovel about the second axis, a horizontal crosstie rigidly interconnecting the arms a short distance from the second axis, the crosstie being closer to the first axis than is the second axis, the second axis being disposed above a plane including the first axis and passing through the crosstie in a lower position of the shovel, and the shovel having an upper rear extension that contacts and overlies the crosstie in an upwardly swung position of the shovel relative to the arms.

5. A self-loading dump vehicle having a chassis and a dump body mounted on the chassis for vertical swinging movement about a first horizontal axis located adjacent the front of the vehicle, a U-shaped yoke secured to the dump body and extending across the rear of the dump body and having portions extending forward on either side of the dump body and resting against the chassis in the lowermost position of the dump body, the chassis and said yoke in said lowermost position having contact with each other over regions of interengagement having upper and lower limits of elevation, and a vertically swinging load support including a front loading shovel mounted on said yoke for vertical swinging movement about a second horizontal axis disposed rearwardly of said first horizontal axis and at an elevation between the elevations of said upper and lower limits.

6. A self-loading dump vehicle as claimed in claim 5, and means acting between the vertically swinging load support and the yoke on at least one point spaced from the second axis to swing the vertically swinging load support about the second axis.

7. A self-loading dump vehicle as claimed in claim 5, the vertically swinging load support including a pair of arms mounted adjacent one end on said yoke for vertical swinging movement about the second axis, means for mounting the shovel on the arms adjacent the other ends of the arms for vertical swinging movement relative to the arms about a third horizontal axis parallel to the first and second axes, and means acting between a point on the shovel which is below the third axis in a lower position of the shovel and a point on at least one of the arms which is below the second axis in a lower position of the shovel to swing the shovel relative to the arms about the third axis.

8. A self-loading vehicle having front wheels supporting a front chassis portion and rear wheels supporting a rear chassis portion, means interconnecting the front and rear chassis portions for movement relative to each other about a horizontal axis parallel to the direction of movement of the vehicle, said rear chassis portion supporting an operator's station and said front chassis portion supporting a material receiving body, a vertically swinging load support including a front loading shovel carried by the material receiving body for loading material into the material receiving body, said horizontal axis being contained in a horizontal plane passing through the front and rear wheel axes.

9. A self-loading dump vehicle comprising: a chassis, a dump body mounted on said chassis for vertical swinging movement about a first horizontal axis located adjacent the front of the vehicle, a support member secured to the dump body with a first portion thereof extending transversely of the rearward portion of the dump body, said support member having at least one second portion extending forwardly of the dump body which engages said chassis in the lowermost position of the dump body, said second portion having contact with at least vertically spaced portions of said chassis, and a vertically swinging load support including a front loading shovel mounted on said support member for vertical swinging movement about a second horizontal axis disposed rearwardly of said first horizontal axis and at an elevation intermediate said vertically spaced portions of said chassis.

10. A self-loading vehicle having front wheels supporting a front chassis portion and rear wheels supporting a rear chassis portion, means interconnecting the front and rear chassis portions for movement relative to each other about a first horizontal axis, a material receiving body supported on one of said chassis portions for pivotable movement about a second horizontal axis, a vertically swinging load support including a front loading shovel carried by the material receiving body for loading material into the material receiving body, said first horizontal axis being perpendicular to a vertical plane that includes said second horizontal axis, said first horizontal axis being disposed no higher than about the plane of the axes of the front and rear wheel axles, respectively.

11. A self-loading dump vehicle comprising: a frame, a plurality of wheels operatively connected to said frame and rotatable about a first horizontal axis, a dump body mounted on said frame for vertical swinging movement about a second horizontal axis, at least a major portion of the dump body being disposed above and to one side of the first axis, the second axis being disposed below and to the other side of the first axis, and a vertically swinging load support carried by the dump body for vertical swinging movement about a third horizontal axis disposed below said first and said second axes.

12. A self-loading dump vehicle comprising: a frame, a plurality of wheels operatively connected to said frame and rotatable about a first horizontal axis, a dump body mounted on said frame for vertical swinging movement about a second horizontal axis, at least a major portion of the dump body being disposed above and to one side of the first axis, the second axis being disposed below and to the other side of the first axis, and a vertically swinging load support carried by the dump body for vertical swinging movement about a third horizontal axis disposed below said first and said second axes, said dump body having a closed rear end on said one side of the first axis and an open front end on said other side of the first axis.

13. A self-loading vehicle comprising: a pair of front wheels rotatable about an axis of rotation and supporting a front chassis portion; a material receiving body supported in a material receiving position on said front chassis portion; an elongated load support mounted on the material receiving body for vertical swinging movement about a first horizontal axis disposed rearwardly adjacent said front wheels and below a horizontal plane passing through said axis of rotation; a shovel mounted on said load support for vertical swinging movement relative to the load support about a second horizontal axis disposed forwardly adjacent said front wheels; said first and second horizontal axes vertically disposed adjacent said horizontal plane; and means mounting the body on said frame for vertical swinging movement about a third horizontal axis.

14. A self-loading vehicle comprising: a pair of front wheels rotatable about an axis of rotation and supporting a front chassis portion; a material receiving body supported in a material receiving position on said front chassis portion; an elongated load support having one portion mounted on the material receiving body for vertical swinging movement about a first horizontal axis disposed rearwardly adjacent said front wheels and below a horizontal plane passing through said axis of rotation; a shovel mounted on said load support spaced longitudinally of said one portion for vertical swinging movement relative to the load support about a second horizontal axis disposed forwardly adjacent said front wheels; said first and second horizontal axes vertically disposed in close proximity to said horizontal plane; and means mounting the body on said frame for vertical swinging movement about a third horizontal axis.

15. A self-loading vehicle comprising: a pair of front wheels supporting a front chassis portion and a pair of rear wheels supporting a rear chassis portion; means interconnecting the front and rear chassis portions for movement relative to each other about a first horizontal axis; a material receiving body supported on said front chassis portion; an elongated load support having one portion mounted on the material receiving body for vertical swinging movement about a second horizontal axis disposed rearwardly adjacent said front wheels; a shovel mounted on said load support spaced longitudinally of said one portion for vertical swinging movement relative to the load support about a third horizontal axis disposed forwardly adjacent said front wheels; said second and third horizontal axes vertically disposed adjacent a horizontal plane passing through the axis of said front wheels; means mounting the body on said frame for vertical swinging movement about a fourth horizontal axis; and said first horizontal axis being perpendicular to vertical planes that include said second, third and fourth axes, respectively.

References Cited by the Examiner

UNITED STATES PATENTS

| | | | |
|---|---|---|---|
| 1,552,281 | 9/1925 | Edwards. | |
| 1,904,345 | 4/1933 | Anthony et al. | 298—22 |
| 2,576,001 | 11/1951 | Daniels | 214—501 |
| 2,620,225 | 12/1952 | Hutchinson | 298—22 |
| 2,624,478 | 1/1953 | Kaplan | 214—501 X |
| 2,824,655 | 2/1958 | Harbers | 214—78 |
| 2,835,397 | 5/1958 | Wagner | 214—140 |
| 3,027,029 | 3/1962 | Clarke | 214—501 |

FOREIGN PATENTS 603,878 6/1959 Austria.

GERALD M. FORLENZA, *Primary Examiner.*

A. J. MAKAY, *Assistant Examiner.*